United States Patent

Duning et al.

[11] Patent Number: 5,971,496
[45] Date of Patent: Oct. 26, 1999

[54] VEHICLE WHEEL HAVING A LARGE CONTACT SURFACE AREA

[75] Inventors: Ralf Duning, Solingen; Uwe Gohrbandt, Haan; Hans-Joachim Däfler, Erkrath, all of Germany

[73] Assignee: Mannesmann Aktiengesellschaft, Düsseldorf, Germany

[21] Appl. No.: 08/875,933

[22] PCT Filed: Feb. 6, 1996

[86] PCT No.: PCT/DE96/00260

§ 371 Date: Aug. 8, 1997

§ 102(e) Date: Aug. 8, 1997

[87] PCT Pub. No.: WO96/24497

PCT Pub. Date: Aug. 15, 1996

[30] Foreign Application Priority Data

Feb. 8, 1995 [DE] Germany .......................... 195 05 782
Jan. 19, 1996 [DE] Germany .......................... 196 03 968
Jan. 26, 1996 [DE] Germany .......................... 196 03 968

[51] Int. Cl.$^6$ ..................................................... B60B 3/16
[52] U.S. Cl. ........................................ 301/35.62; 301/114
[58] Field of Search .............................. 301/35.62, 63.1, 301/111, 114

[56] References Cited

U.S. PATENT DOCUMENTS

| | | | |
|---|---|---|---|
| 1,635,894 | 7/1927 | Michelin | 301/35.62 X |
| 1,787,074 | 12/1930 | Hunt | 301/63.1 X |
| 1,812,437 | 6/1931 | Hunt | 301/63.1 |
| 2,083,326 | 6/1937 | Eksergian | 301/63.1 X |
| 2,847,252 | 8/1958 | Lyon | 301/63.1 X |
| 2,877,054 | 3/1959 | Hedlund et al. | 301/35.62 |
| 3,664,708 | 5/1972 | Verdier | 301/35.62 |

*Primary Examiner*—Russell D. Stormer
*Attorney, Agent, or Firm*—Cohen, Pontani, Lieberman & Pavane

[57] ABSTRACT

A vehicle having a rim and a wheel disk center or convex wheel disk which is connected thereto and is secured by a hub or brake drum with a plurality of connection bosses for the wheel bolt holes arranged along the circumference of the bolt pitch circle. The connection bosses have a spherical or conical countersink, and the region surrounding the countersink is cambered outward. The wheel disk center or convex wheel disk has contact surfaces for the hub or brake drum which are distributed along the circumference. The region of the connection boss which surrounds the countersink, is significantly thicker in all cross-sectional planes than the more remote region which forms the wheel disk center or convex wheel disk. The region surrounding the countersink forms an integral unit with the more remote region. The region directly adjoining the countersink has the greatest thickness which continuously decreases radially outward as viewed from the axis of the countersink, and then merges in a rounded or tangential manner into the region which has a virtually constant thickness which corresponds substantially to the initial thickness of the round blank for the integral forming of the wheel disk center or convex wheel disk.

5 Claims, 3 Drawing Sheets

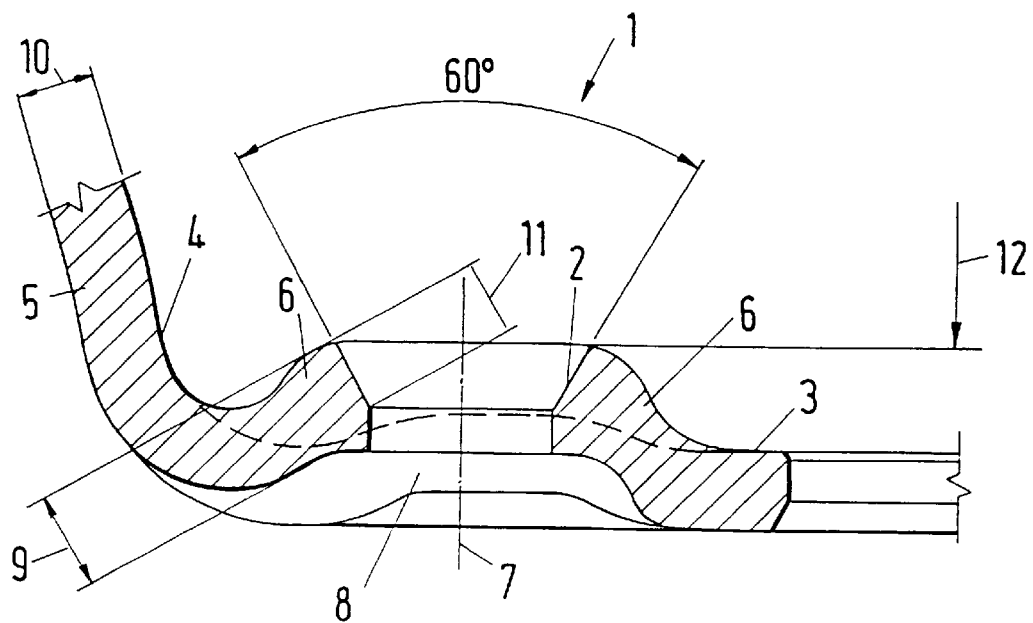
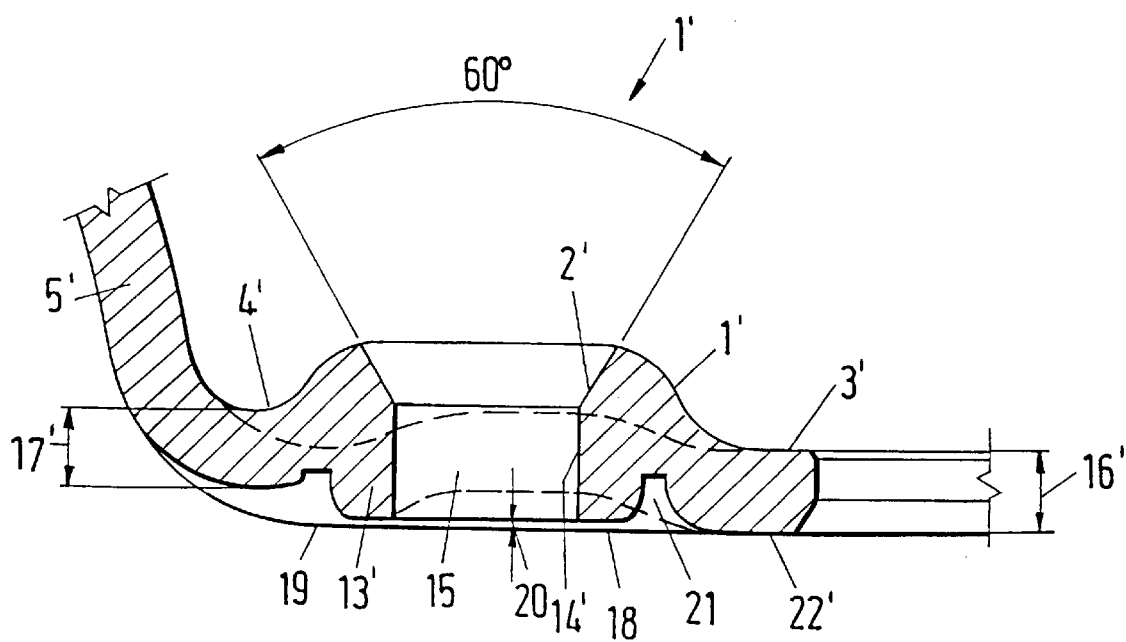

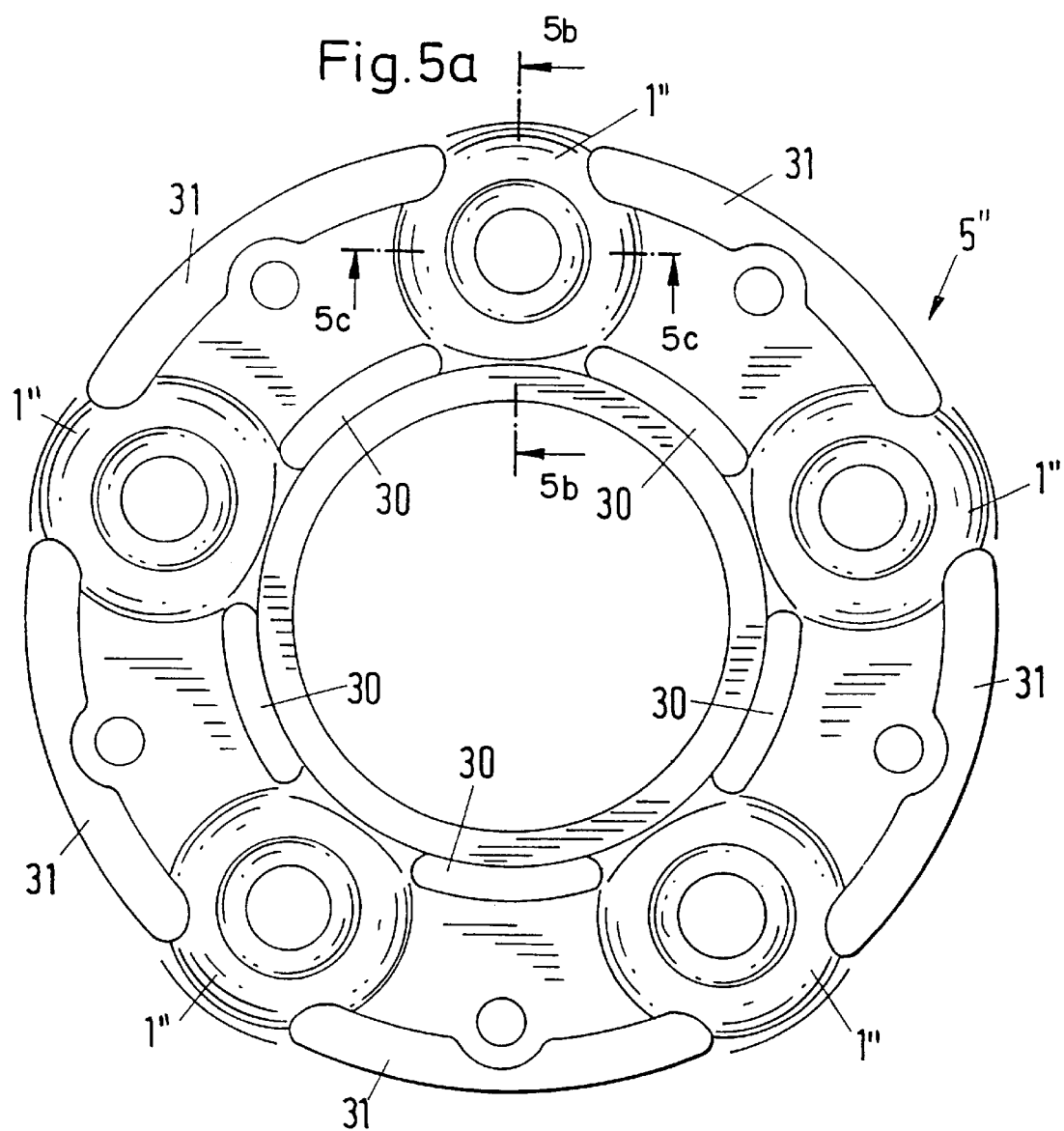

VEHICLE WHEEL HAVING A LARGE CONTACT SURFACE AREA

BACKGROUND OF THE INVENTION

1. Field of the Invention

The invention is directed to a vehicle wheel.

2. Discussion of the Prior Art

When a vehicle wheel, comprising a rim and a wheel disk center and convex wheel disk which are connected therewith, is mounted on a vehicle, the wheel disk center or convex wheel disk is connected in a frictional engagement with the hub or brake drum by wheel bolts. The wheel bolts are tightened by a torque wrench in order to generate a defined, sufficiently large longitudinal force along the bolt. The magnitude of the required bolt longitudinal force is determined, among others factors, by the quantity of bolts, the friction diameter of the contact surfaces, the friction coefficients between the connection elements, and the driving torque or braking torque to be transmitted. An added safety factor is imposed on the required bolt longitudinal force which takes into account the forces acting on the bolt when the wheels are rolling.

The connection boss and countersink of the wheel are clamped with the hub or brake drum via the longitudinal force of the bolt. The countersink has the function of opposing an elastic resilience to the bolt longitudinal force to the extent of elevated values such as occur as a result of misuse, e.g., oiled bolts or excessive tightening torques, since a plastic flow would lead to a decrease in the bolt longitudinal force and accordingly ultimately to a loosening of the wheel bolts.

Known constructions of connection bosses derive their spring rigidity in the direction of the longitudinal axis of the bolt from a bending of the material arranged annularly around the countersink. Constructional stiffening is known for the purpose of increasing spring rigidity over that of normal plate thickness. One possibility consists in an inward reverse drawing or camber of the region of the connection boss located inside radially. Moreover, this shape has the advantage of an outward enlargement of the contact surface relative to the wheel bolts compared with a simple camber. For example, reference is had to the wheel catalog of Mannesmann Kronprinz AG, 1990/1991 Issue, bottom of page 28. A disadvantage in prior constructions of the connection boss is the clear dependency of the stiffness of the connection boss on the plate thickness and on the material strength of the starting material.

A wheel comprising a profiled rim and a convex wheel disk connected therewith in the drop base region by means of welding is known from U.S. Pat. No. 3,664,708. To prevent cracking in the connection boss as the result of excessive tightening of the wheel bolts, it is suggested to arrange a flange-like bushing in the connection boss. The region of the bushing constructed in the manner of a flange lies on the side facing the hub or brake drum and must be inserted through the connection boss before the wheel is mounted. After placement on the wheel, a cone of the front region of the bushing is formed by of tightening the wheel nut. This cone comes to rest on the edge region of the connection boss, but only when the end face of the flange-like region of the bushing rests on the hub or brake drum. A disadvantage in this design is that special bushings must be produced which can easily fall out of the connection boss during the mounting of the wheel until the cone fixing the bushing is formed. Further, this arrangement is suitable only for wheels with stud pins arranged at the hub or brake drum, since the bushings can fall out easily during mounting in the otherwise conventional wheel bolt fastening. Another disadvantage consists in that the bushing always fits only one type of wheel, so that for a hundred different wheel types, a hundred different bushings will have to be produced and stocked. Further, confusion can lead to the wrong bushing being used. Another disadvantage is that at least two setting gaps remain as a result of the two-part arrangement. This is very prejudicial to the stability of the bolt longitudinal force. Moreover, the bending spring is already highly loaded in the course of mounting, since the cone of the bushing is formed by means of the wheel nut.

French reference FR-A-25 39 079 discloses a special wheel hub construction. The sole figure shows a section of the vehicle wheel, including a region of the convex wheel disk. The convex wheel disk is provided with a plurality of connection bosses for the wheel bolt holes arranged along the circumference of the bolt pitch circle. The connection boss has a conical countersink, and the region surrounding the countersink is cambered outward. The region of the connection boss surrounding the countersink is significantly thicker and all cross-sectional planes than the more remote region of the convex wheel disk. The region directly adjoining the countersink has the greatest thickness which then decreases in a continuous manner radially outward as viewed from the axis of the countersink and then merges in a rounded manner into the adjoining region. This adjoining region has a virtually constant thickness which corresponds substantially to the initial thickness of the round blank for the integral forming of the convex wheel disk.

SUMMARY OF THE INVENTION

It is the object of the invention to provide a vehicle wheel comprising a rim and a wheel disk center or convex wheel disk connected therewith, preferably a metal wheel disk center or convex wheel disk, in particular manufactured from light metal, which is simple to mount and reliably prevents a loosening of the wheel bolts during driving. Further, a large contact surface is provided for preventing area pressure at the wheel bolts.

According to the invention, the region surrounding the countersink is significantly thicker than a process-related conventional tapering. The region directly adjoining the countersink has the greatest thickness which decreases continuously radially outward and merges in a rounded manner or tangentially in the adjoining region. This adjoining region is characterized in that it has a virtually constant thickness which substantially corresponds to the initial thickness of the round blank for producing the wheel disk center or convex wheel disk. The stiffness of the connection boss acting as a bending a spring is increased by the deliberate upsetting in the countersink region. Further, there is increased resistance against an expansion of the countersink when tightening the wheel bolt. The thickness of the rest of the plate can accordingly be reduced to a minimum, since the weak point—the connection boss—has a sufficient stiffness which also makes allowance for incorrect use of the wheel bolts. The increase in thickness is preferably effected axially outward in order to form the largest possible contact surface between the wheel bolt and the countersink. In so doing, however, the limitation consisting of the prescribed connection dimensions must be taken into account. In every case, the surface pressure between the wheel bolt and the countersink is minimized by the increased contact surface. The suggested formation of the connection boss is applicable for all wheels made from metal, but particularly those made from light metal, since this material, by its nature, brings about a reduction in strength. In order to make the weak point—the connection boss—more reliable for wheels of light metal, it is suggested in a further embodiment to press material inward axially, in addition, so as to form a toroidal ring. The spring stiffness of the connection boss is substantially increased in this way, since the stiffness of the toroidal ring acting as a pressure spring is added to the bending component of the surrounding region. The ring is supported on the hub or brake drum while the wheel bolt is being tightened. When not screwed on, the end face of the toroidal ring has a defined gap height relative to the contact surface on the hub or brake drum. This spacing is used for adapting the interaction between the bending spring and pressure spring and accordingly for influencing the bolt longitudinal force of the tightening torque.

This toroidal ring has the advantage that a plastic deformation of the region subjected to bending load is prevented and a spring stiffness can be adjusted over the geometric formation of the ring so as to be extensively independent from the utilized material with respect to strength and thickness. It has proven advantageous when the toroidal ring is enclosed by an annular groove or a rounded recess. The latter variant is particularly advantageous for steel wheels, since the risk of cracking in the region of transition from the groove to the ring is accordingly reduced.

The suggested construction is particularly advantageous for a light metal wheel manufactured from plate metal, but is equally suitable for a steel wheel or a cast light metal wheel. The countersink construction according to the invention has the substantial advantage that it meets the automobile industry demand for wheel bolts which are as homogeneous as possible, since the countersink stiffness can be adapted extensively independently from the height of the countersink and the initial thickness of the starting material.

In the production of the vehicle wheel according to the invention, in contrast to the known prior art, in the forming of the connection boss the material volume to be punched out or stamped out is reduced and the material economized in this way is displaced by upsetting from the subsequent countersink into the adjoining region by means of an optimized pressing and cambering with simultaneous variable holding. In addition, in the formation of the toroidal ring, especially in the production of light metal wheels, material is pressed axially inward by means of axial pressing.

The vehicle wheel according to the invention is explained more fully in the drawing with reference to several embodiments.

BRIEF DESCRIPTION OF THE DRAWINGS

FIG. 1 is a cross-sectional view in partial section of a first embodiment of the vehicle wheel according to the invention in the region of the connection boss;

FIG. 2 shows a second embodiment through the same cross section as in FIG. 1;

FIG. 5a and is a top view of the outside of the convex wheel disk;

FIG. 5b shows a section A—A in FIG. 5a and;

FIG. 5c shows a section B—B in FIG. 5b.

DETAILED DESCRIPTION OF THE PREFERRED EMBODIMENTS

Figure 3:
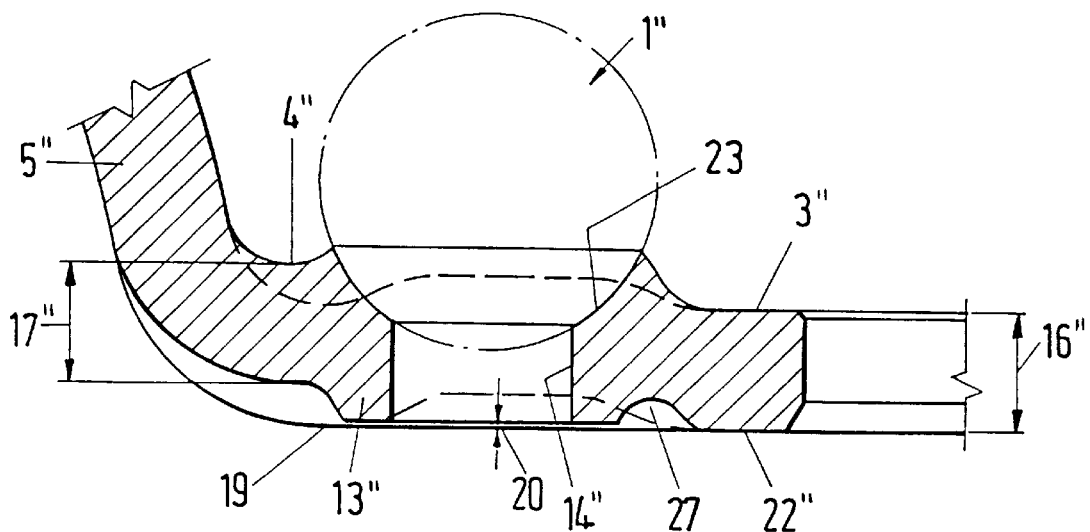
FIG. 3 shows a third embodiment through the same cross section as in FIG. 2.

FIG. 1 shows a cross-sectional view of a partial section of a first embodiment of the vehicle wheel according to the invention in the region of the connection boss 1. The connection boss 1 has a conically formed countersink 2 with a cone angle of 60°, for example. The connection boss 1 is cambered outward beyond the adjoining region 3, 4 in a known manner. Part of the adjoining portion of the convex wheel disk 5 is indicated here. According to the invention, the region 6 surrounding the countersink is significantly thicker than the region forming the convex wheel disk 5. The region directly adjoining the countersink 2 has the greatest thickness which then continuously decreases outward radially considered from the axis 7 of the countersink 2 and then merges in a rounded manner or tangentially, as the case may be, in the adjoining region 3, 4. The dashed lines and solid lines somewhat below the connection boss 1 show, by way of example, the region 8 of the wheel disk center and convex wheel disk 8 lying between two connection bosses 1 as seen in the circumferential direction. The thickness 9 in the immediate area of the countersink 2 is at least 15%, preferably more than 25%, greater in comparison with the thickness 10 of the region forming the convex wheel disk 5. In addition to the increase in stiffness of the connection boss 1, the upset material, according to the invention, in the countersink region brings about an enlargement of the contact surface 11 with the wheel bolt 24 (see also FIG. 4). For this reason, the thickness increase is preferably directed outward axially, wherein, however, the prescribed connection dimensions indicated by arrow 12 should be taken into account.

FIG. 2 is a cross-sectional view identical to that shown in FIG. 1 showing a second embodiment, wherein the same reference numbers have been selected for identical parts. In contrast to FIG. 1, the connection boss 1' has an inwardly directed toroidal ring 13' which is defined radially inside by the cylindrical part 14' of the bolt hole 15 whose extension, according to the invention, can be greater than the material thickness 16', 17' of the adjoining regions 3', 4' in the axial direction. The end face 18 of the toroidal ring 13' has a defined gap height 20 relative to the contact surface 19 of the wheel located outside radially when not in the screwed on state. The point of application of the ring 13' acting as pressure spring can be adapted relative to the surrounding region 3', 4' acting as bending spring. The spring rigidity of the toroidal ring 13' is substantially determined by the material volume utilized as a spring which can be determined, for example, by the breadth and depth of the annular groove 21. During mounting and subsequent tightening of the wheel bolt 24 (see FIG. 4), the contact surface 19 arranged radially outside first contacts the contact surface 26 of the hub 25. When the tightening torque of the wheel bolt 24 is increased to the value generally established by the vehicle manufacturer, the contact surface 22' located on the radial inside of the wheel now contacts the contact surface 26 of the hub 25 (see FIG. 4). From this point, the surrounding region 3', 4' of the connection boss 1' acts as a bending spring until the end face 18 comes into contact with the contact surface of the hub 25 and the toroidal ring 13' acts additionally as a pressure spring. The embodiment shown in FIG. 2 is preferably applied for light metal wheels to compensate for the reduced strength of material at the weak point represented by the connection boss 1'.

FIG. 3 shows a cross-sectional view identical to that shown in FIG. 2 showing a third embodiment of the region according to the invention. Again, the same reference numbers are used for identical parts with the addition of a prime. In contrast to FIG. 2, the countersink 23 is spherical. The fundamental arrangement and manner of operation of the construction of the connection boss 1' according to the invention are the same as described above. However, the transition from the toroidal ring 13' to the adjacent regions 3', 4' are configured somewhat differently. Instead of a stamped annular groove 21 (FIG. 2), a more or less rounded recess 27 is provided in the present embodiment. This embodiment is preferably used in steel wheels.

Figure 4:
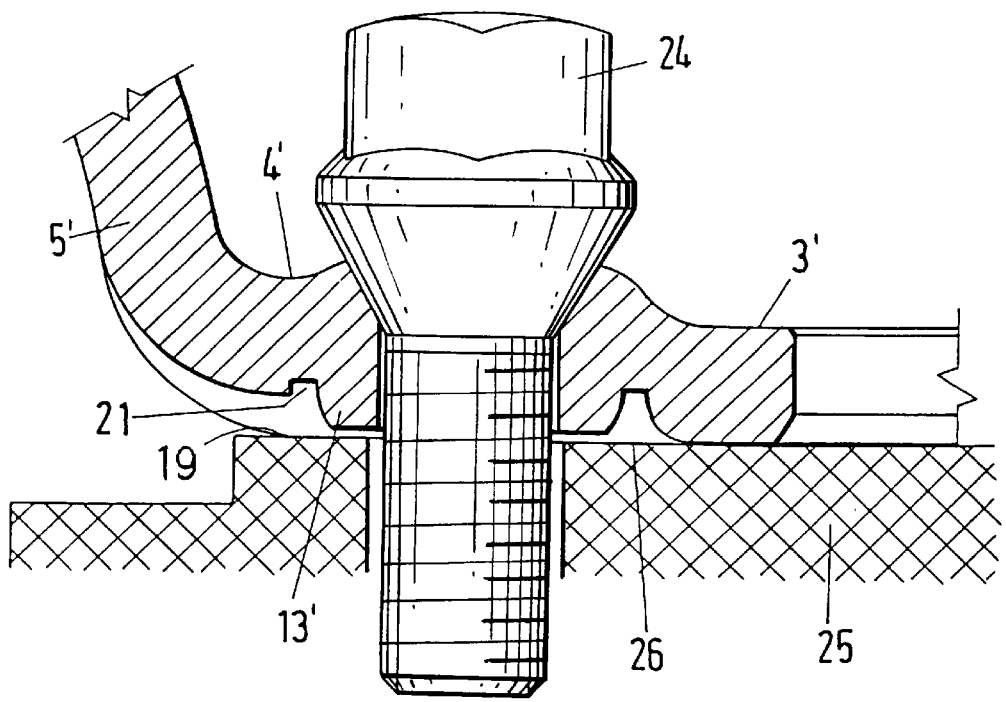
FIG. 4 shows the embodiment in FIG. 2 in combination with a wheel bolt and the hub or brake drum in a state of use.

FIG. 4 is identical to the embodiment shown in FIG. 2; however, FIG. 4 shows the cooperation of the connection boss, according to the invention, of the wheel disk center or convex wheel disk 5' with a wheel bolt 24 and a part of the hub or brake drum 25. The drawing shows the state at the moment when the radially outwardly arranged contact surface 19 of the wheel is in contact with the contact surface 26 of the hub 25, but no bolt longitudinal force is as yet in effect. The stepped contact of the individual surface regions with the contact surface 26 of the hub 25 is only brought about by the actual tightening of the wheel bolt 24 with a wrench or torque wrench.

FIGS. 5a to 5c show a top view and two sectional views of the vehicle wheel according to the invention. FIG. 5a shows the outside of the convex wheel disk 5'. The embodiment of the connection bosses 1' substantially corresponds to the view shown in FIG. 3. FIG. 5a clearly shows the stamped contact surfaces 30, 31. According to the invention, the contact surfaces 31 located outside radially are brought as close as possible to the respective connection boss 1'. The wheel bolt 24 is relieved of loading by this stamping. Since the distance between the wheel bolt 24 and effective contact surface 31 is small and the bending lever arm is accordingly shortened, the wheel bolt 24 is relieved of loading to the desired extent.

We claim:

1. A vehicle wheel, comprising:

a rim;

one of a wheel disk center and a convex wheel disk each defining a plane and being connected to the rim and having contact surfaces configured to be engagable with one of a hub and a brake drum;

a plurality of connection bosses for wheel bolt holes, arranged on a circumference of a bolt pitch circle, each of the connection bosses having one of a spherical and a conical countersink, and a region that surrounds the countersink, is cambered axially outwardly and is thicker in all cross-sectional planes than the one of the wheel disk center and the convex wheel disk, the region surrounding the countersink being formed as an integral part with the one of the wheel disk center and the convex wheel disk and being configured to have a maximum thickness that decreases continuously radially outward from a center axis of the countersink and merges in a region of the one of the wheel disk center and the convex wheel disk that has a substantially constant thickness; and an inwardly directed toroidal ring provided at each of the bosses so as to form an inwardly directed increase in thickness, the toroidal ring being configured to be contactable with the one of the hub and the brake drum so as to form a pressure spring with adaptable spring stiffness which acts in addition to spring stiffness from bending of a region adjoining the toroidal ring, the toroidal ring being configured to form a defined gap relative to the one of the hub and brake drum in a rest state, so that a point of application of the pressure spring relative to the bending spring can be determined by dimensions of the gap, the one of the wheel disk center and the convex wheel disk having contact surfaces arranged so as to be distributed along the circumference on a radially outward side and on a radially inward side.

2. A vehicle wheel according to claim 1, wherein the spring stiffness of the toroidal ring acting as a pressure spring can be adapted by a quantity and configuration of a material volume utilized for providing spring properties, so as to be extensively independent from a thickness and strength of the material.

3. A vehicle wheel according to claim 1, wherein an annular groove is arranged around the toroidal ring.

4. A vehicle wheel according to claim 1, wherein a rounded recess configured to extend outwardly in a fiat manner is arranged around the toroidal ring.

5. A vehicle wheel according to claim 1, wherein each bolt hole has a cylindrical portion with a length in the axial direction that is greater than a material thickness of the regions adjoining the toroidal ring.

\* \* \* \* \*